(12) United States Patent
Maffeis

(10) Patent No.: US 9,906,487 B2
(45) Date of Patent: Feb. 27, 2018

(54) MESSAGING PROXY SYSTEM

(71) Applicant: Taiwan Semiconductor Manufacturing Company, Ltd., Hsin-Chu (TW)

(72) Inventor: Silvano Maffeis, Haegelerstrasse (CH)

(73) Assignee: Taiwan Semiconductor Manufacturing Company, Ltd., Hsin-Chu (TW)

( * ) Notice: Subject to any disclaimer, the term of this patent is extended or adjusted under 35 U.S.C. 154(b) by 1079 days.

(21) Appl. No.: 14/153,958

(22) Filed: Jan. 13, 2014

(65) Prior Publication Data

US 2014/0129657 A1 May 8, 2014

Related U.S. Application Data

(60) Continuation of application No. 12/371,921, filed on Feb. 17, 2009, now Pat. No. 8,650,244, which is a (Continued)

(51) Int. Cl.
*H04L 12/58* (2006.01)
*H04L 29/06* (2006.01)
(Continued)

(52) U.S. Cl.
CPC .............. *H04L 51/38* (2013.01); *H04L 29/06* (2013.01); *H04L 67/04* (2013.01); *H04L 67/28* (2013.01); *H04L 67/2823* (2013.01); *H04L 67/2876* (2013.01); *H04L 67/34* (2013.01); *H04L 69/16* (2013.01); *H04L 69/169* (2013.01); *H04W 88/182* (2013.01); *H04L 69/329* (2013.01); *H04W 4/12* (2013.01); *H04W 76/02* (2013.01); *H04W 88/02* (2013.01)

(58) Field of Classification Search
CPC ...... H04W 76/02; H04W 88/02; H04L 69/329
See application file for complete search history.

(56) References Cited

U.S. PATENT DOCUMENTS 5,566,225 A 10/1996 Haas
5,754,938 A * 5/1998 Herz .................... G06Q 20/383
348/E7.056
(Continued)

*Primary Examiner* — Douglas Blair
(74) *Attorney, Agent, or Firm* — Slater Matsil, LLP

(57) ABSTRACT

A messaging proxy system is disclosed for the purpose of delivering data in the form of a portable message format from a producer running on a mobile or non-mobile computer, over any wireless network, by passing this data through an intermediary proxy computer program, to one or more recipients running on mobile or non-mobile computers. The system includes a message proxy computer program with at least one pluggable transport protocol adapter. The proxy contains a command subsystem for sending and receiving command- and message-tokens to and from the mobile clients. The system further includes a thin messaging middleware client to run on mobile devices. The thin messaging middleware client includes at least one pluggable protocol adapter. The client also comprises a command subsystem for sending and receiving command- and message-tokens to and from the proxy The proxy also contains a communication subsystem for sending and receiving messages via a state of the art message oriented middleware.

20 Claims, 2 Drawing Sheets

Related U.S. Application Data division of application No. 10/824,200, filed on Apr. 13, 2004, now abandoned, which is a continuation of application No. 09/611,629, filed on Jul. 7, 2000, now Pat. No. 6,721,779.

(51) Int. Cl.
  *H04W 88/18* (2009.01)
  *H04L 29/08* (2006.01)
  *H04W 4/12* (2009.01)
  *H04W 76/02* (2009.01)
  *H04W 88/02* (2009.01)

(56) References Cited

U.S. PATENT DOCUMENTS

| | | | |
|---|---|---|---|
| 5,987,256 A | | 11/1999 | Wu et al. |
| 6,044,372 A | * | 3/2000 | Rothfus ............... G06Q 10/10 |
| 6,212,548 B1 | * | 4/2001 | DeSimone .......... H04L 12/1813 709/204 |
| 6,347,307 B1 | * | 2/2002 | Sandhu ................ G06Q 40/00 705/36 R |
| 6,473,748 B1 | | 10/2002 | Archer |
| 6,484,196 B1 | * | 11/2002 | Maurille ............. H04L 12/1831 370/260 |
| 6,651,086 B1 | * | 11/2003 | Manber ............... H04L 12/1822 707/999.102 |
| 6,721,779 B1 | * | 4/2004 | Maffeis .................. H04L 29/06 709/202 |
| 6,738,808 B1 | | 5/2004 | Zellner et al. |
| 6,748,455 B1 | * | 6/2004 | Hinson .................. G06F 9/542 719/318 |
| 6,877,023 B1 | | 4/2005 | Maffeis et al. |
| 6,928,280 B1 | * | 8/2005 | Xanthos ............... C12Q 1/6837 455/423 |
| 6,950,857 B1 | | 9/2005 | Arnold |
| 7,069,319 B2 | | 6/2006 | Zellner et al. |
| 7,200,807 B2 | | 4/2007 | Wu et al. |
| 7,302,643 B1 | * | 11/2007 | Edlund ............ G06Q 10/06314 715/703 |
| 7,458,082 B1 | * | 11/2008 | Slaughter ................ G06F 9/547 713/153 |
| 7,489,704 B2 | | 2/2009 | Maffeis et al. |
| 8,650,244 B2 | * | 2/2014 | Maffeis .................. H04L 29/06 709/203 |
| 2009/0047937 A1 | | 2/2009 | Zellner et al. |

\* cited by examiner

MESSAGING PROXY SYSTEM

CROSS-REFERENCE TO RELATED APPLICATIONS

This application is a continuation of U.S. patent application Ser. No. 12/371,921, filed on Feb. 17, 2009, which is a divisional of U.S. patent application Ser. No. 10/824,200, filed on Apr. 13, 2004, which is a continuation of U.S. patent application Ser. No. 09/611,629, filed on Jul. 7, 2000, now U.S. Pat. No. 6,721,779, each of which is incorporated herein by reference for all purposes.

FIELD OF THE INVENTION

The invention relates to techniques for the delivery of electronic messages between hardware or software components across wireless and wireline networks, between mobile and non-mobile devices.

BACKGROUND OF THE INVENTION

Message oriented middleware (MOM) has been available for many years. In October 1998, an industry standard emerged from Sun Microsystems, the Java Message Service (JMS). At a programming interface level, this standard describes how a messaging middleware is accessed from a Java application. The two main abstractions of JMS are "topics" (publish/subscribe messaging) and "queues" (point-to-point messaging). While the standard describes the interface to the messaging middleware, the implementation of the middleware is not specified. Also, integration of wireless mobile devices (such as phones, pagers, personal digital assistants or laptops) is not specified.

Existing messaging middleware allows one to access the middleware from non-mobile devices (personal computers or server computers) over wireline networks (Ethernet or Token Ring). These networks usually run communication protocols such as TCP/IP, HTTP or SSL. Supporting wireless mobile devices requires the vendor of the middleware to implement a message transmission protocol atop a wireless transport protocol (such as WAP, GSM, SMS, GPRS, or UMTS) and to integrate this message transmission protocol into the middleware.

This leads to limited applicability for the following reasons:
- State of the art JMS messaging middleware requires more computer memory than is available on mobile devices.
- Mobile devices, which are often disconnected from a corporate network, are unsupported in state of the art JMS messaging middleware products.
- Wireless protocols such as WAP, SMS, GPRS or UMTS are not supported by state of the art JMS messaging middleware products, unless the TCP/IP, HTTP or SSL protocol is used atop those wireless protocols.
- Though state of the art JMS messaging middleware products support communication protocols such as TCP/IP, HTTP, and SSL, they do not support any other communication protocols.

Further, there are considerable performance impacts, as TCP, HTTP or SSL were designed for wireline networks and thus do not perform well on wireless networks.

SUMMARY OF THE INVENTION

A first object of the invention is therefore to provide a system for the delivery of data between applications serving as clients and running on mobile wireless devices and applications running on computers of a wired network. Another object of the invention is to provide a method for delivering data between as application serving as client and running on a mobile wifeless device and an application running on a computer of a wired network. Yet another object of the invention is to provide a computer program loadable into the memory of a computer usable for delivering messages between clients on mobile wireless devices and applications running on computers. A further object of the invention is to provide a computer program product comprising a computer usable medium having thereon computer readable program code means for implementing on a computer connected to a wired computer network. Still another object of the invention is to provide a computer program directly loadable into the memory of a mobile device and allowing the mobile device to access a messaging middleware product according to the state of the art, without needing to load that messaging middleware into the memory of the mobile device entirely.

The messaging proxy system outlined in this disclosure is a major technological advancement enabling users of state of the art messaging middleware products to send and receive messages to and from mobile devices, over any wireless transport protocol, without requiring that the state of the art messaging middleware be loaded into the memory of the mobile devices.

The system for running said message proxy installation includes a message proxy implemented by a computer program with a system architecture comprising at least one pluggable protocol adapter. In a preferred embodiment of the invention, the proxy further comprises at least one-pluggable database adapter.

The invention also comprises a thin message client computer program directly loadable into the memory of a mobile device. This thin message client program allows a mobile device to exchange message and command tokens with a message oriented middleware according to the state of the art, by using the proxy computer program as an intermediary between the thin client and the message oriented middleware and thereby using at least one wireless transport protocol. The thin message client computer program embodies a system architecture of at least one pluggable protocol adapter. Preferably, it also embodies a system architecture of at least one pluggable database adapter.

BRIEF DESCRIPTION OF THE DRAWINGS

In the following, an example of an embodiment of the invention is described with reference to drawings. In the drawings.

DESCRIPTION OF THE PREFERRED EMBODIMENTS

Figure 1:
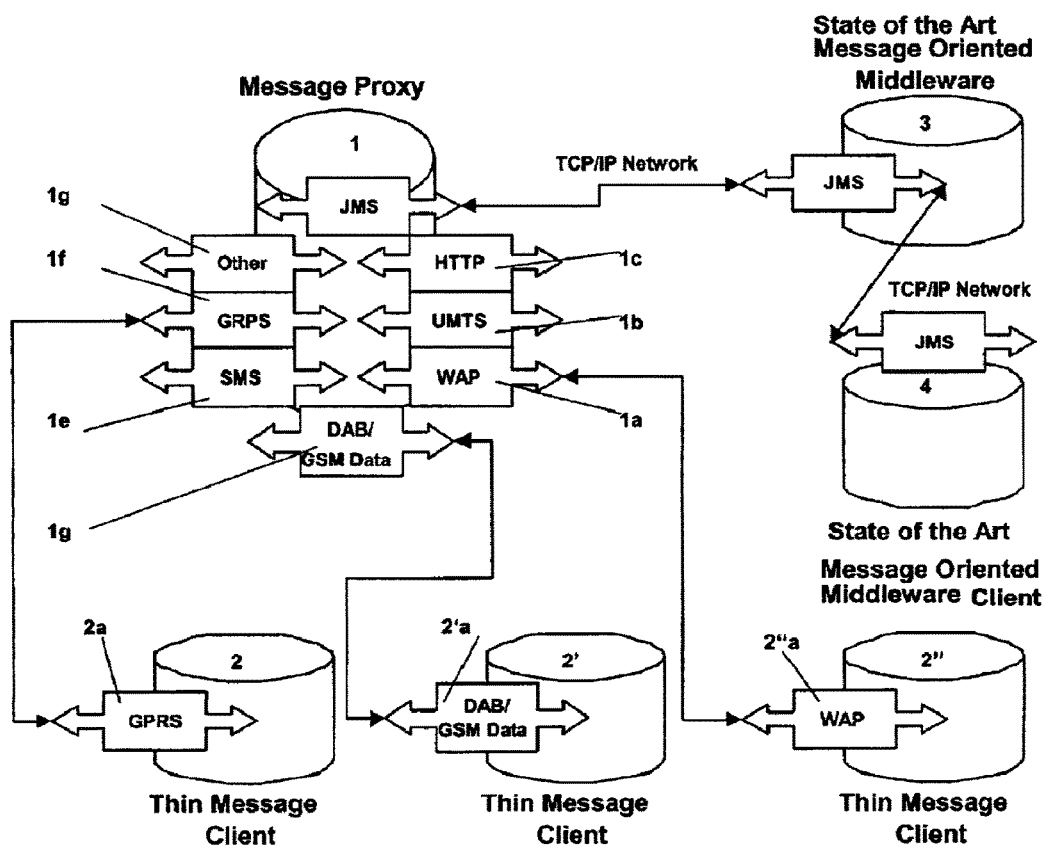
FIG. 1 provides a block diagram of a preferred embodiment of the system according to the present invention.

Now with reference to the drawing, FIG. 1 provides a block diagram of a preferred embodiment of the present invention. It more particularly shows an installation of software tools loaded on non-mobile computers and mobile wireless devices, the installation comprising:

A message proxy 1,

Thin JMS message clients 2, 2', 2" linked to the proxy 1 with a wireless communication protocol, JMS message oriented middleware 3 according to the state of the art, and A JMS message oriented middleware client 4.

The block diagram is but one example of a message proxy infrastructure deployment. Any number of message proxies, thin JMS message clients, message oriented middleware products, and message oriented middleware product clients can be present in a specific installation.

The message proxy 1 may be implemented on a conventional computer network server, e.g. on a Windows-NT-server and may e.g. run in the background. It maintains client connections, maintains client subscriptions to JMS topics and queues, receives and forwards JMS messages, and stores JMS messages in its database, such that they will not be lost when a client is disconnected from the proxy.

The message proxy 1 comprises at least one pluggable transport protocol adapter. FIG. 1 shows an example of six specific wireless transport protocol adapters (WAP 1a, UMTS 1b, HTTP 1c, DAB/GSM Data 1d, SMS 1e, GPRS 1f). Any number of additional wireless protocol adapters 1g can be present. Pluggable protocol adapters allow the message proxy to send and receive messages to and from message clients using arbitrary wireless protocols. A protocol adapter embodies an existing transport protocol, such as GPRS or TCP/IP, and also provides additional features on top of the existing transport protocol. Examples of such additional features include data encryption and guaranteed delivery of messages. A protocol adapter is divided into one or more protocol objects. Each protocol object provides one part of the functionality offered by the protocol adapter. For example, a protocol object can encrypt data, or compress data, or request the sender of the data to retransmit a message which was lost on the network.

The message proxy 1 also comprises a database adapter. This allows the proxy to store messages and client subscription information into arbitrary databases.

On startup, the message proxy 1 reads its configuration data and initializes ail configured protocol adapters. It also initializes the topic and queue subscriptions of all the message clients which are known to the proxy. At runtime, additional protocol adapters can be started, or running protocol adapters can be stopped, without interrupting the message proxy service (however, if a specific protocol adapter is stopped, service over this adapter is no longer available). At runtime, additional clients can be connected to the proxy, or existing clients can be disconnected from the proxy.

Each thin JMS message client 2, 2', 2" is installed on a mobile wireless device such as a mobile phone, a small laptop computer with a wireless modem, a palmtop device or any other device comprising a processor, a memory and communication means for communicating wirelessly. It contains a JMS programming library which is identical or similar to at least a part of the programming library used by messaging middleware 3 of the state of the art. The thin JMS message client library is small enough to be loaded into the memory of the mobile devices which have constrained memory and processing power.

Such a small footprint of the thin JMS message client library is achieved by offloading from the client to the proxy most of the computations and most of the state information which a JMS client application ought to perform or to maintain. The thin JMS message client mainly consists of the JMS interface. Most of the Java code necessary for implementing the interface is running on the proxy, and not on the thin JMS message client. The proxy also maintains the JMS state information associated with the client. For example, the proxy stores the JMS messages which have not been acknowledged by the client yet. Also, the thin JMS message client does not need to store the names of the queues and topics it is subscribed to. This information is stored only by the proxy. Internally, the thin JMS client uses code information, such as number values, to refer to topics and queues. This code information can be as small as one byte. The actual representation of those queues and topics, which can be hundreds or thousands of bytes for each topic or queue, is contained in the proxy. When the thin JMS client wishes to publish a message on a certain topic, the client sends to the proxy only the JMS message and the code information related with the topic. All this considerably reduces the footprint of the thin JMS client.

The thin JMS message client 2 also contains a command and message transmission system comprising a transport protocol adapter 2a, 2a', 2a" used for informing the proxy of what JMS topics and queues the client wants to subscribe to.

The message client 2, 2', 2" also comprises a database adapter. This allows the client to store JMS messages and other information locally, using arbitrary databases. The message database is necessary to ensure that JMS messages and JMS subscriptions submitted by the client are not lost in case the client cannot communicate with the proxy due to lack of wireless network coverage, or because the proxy is not running.

A message client 2, 2', 2" links to the message proxy 1, using its transport protocol adapter 2a, 2a', 2a". If a matching protocol adapter is running on the proxy, the connection is successful. Further communication between message client and message proxy is according to the familiar publish/subscribe or point-to-point model of JMS.

JMS topics or JMS queues are named and administered independently of the protocol adapters involved. If a client connects to the proxy using the "WAP" protocol adapter, it can communicate with a client that connected using the "GPRS" protocol adapter, if both clients use the same JMS topic or queue.

The protocol adapters encapsulate, at least one logic needed to;

Interface with a transport protocol, such as HTTP, WAP or GSM Data.

Specify and guarantee a quality of service for the message delivery.

Certain transport protocols operate in a "best effort" delivery mode. Thus, simply adapting to a specific protocol is not always enough (unless "best effort" is the desired message delivery guarantee). Thus, protocol adapters consist of both the transport protocol mechanism, and a quality of service mechanism to improve the basic network delivery guarantee.

Network reliability is improved as follows. The sending protocol adapter attaches a reliability indicator such as a sequence number to all outgoing messages. The reliability indicator is varied in a predefined manner upon sending a message. E.g., the sequence number is incremented by one after each sent message. The receiver application uses the reliability indicator of the incoming message to detect whether a message was lost. In the described example, this is the case when the sequence number of the just received message is greater than the sequence number of the previous message, plus one. In the event of message loss, the receiver sends a command token to the sender indicating which messages are to be retransmitted. The sender then retransmits the requested messages. The sender keeps messages in a local database to be able to fulfill a message retransmission request.

The database adapters encapsulate at least one logic needed to:

Interface with a database product, such as PointBase, Oracle, DB/2, or Sybase, OR to interface with a portable database access software such as JDBC or ODBC.

Store and retrieve JMS messages and JMS subscription requests.

The message client 2 implements e.g. the JMS API from Sun Microsystems. It cooperates with the proxy to achieve full JMS functionality. When the client wants to subscribe to a JMS queue or topic, its command subsystem creates a command token containing the subscription information. The command token is then sent to the proxy using wireless communication. To this end, the token is sent via a protocol adapter 2s, 2a', 2a" at the client side and received by a protocol adapter 1a, 1b, 1c, 1d, 1e, 1f or 1g at the proxy side.

On receipt of a command token, the proxy 1 reads the subscription information contained in the token, and performs a JMS subscription with the state of the art middleware, on behalf of the client.

Further command tokens are generated when the client wants to unsubscribe from a JMS topic or queue, when the client wants to transmit a JMS message, or for any other JMS action which is requested by the client.

When a JMS message is received on a topic or queue the proxy 1 is subscribed to on behalf of the client, the proxy creates a message token containing the data of the JMS message. The message token is then sent to the client 2 using wireless communication. For that the token is sent via a protocol adapter 1a, 1b, 1c, 1d, 1e, 1f or 1g at the proxy side, and received by the protocol adapter 2a, 2a', 2a" at the client side.

On receipt of such a message token by a thin JMS message client 2, a JMS message is created by the client. Then, the JMS message is processed by the client. For example, the message can be visualized in a graphical user interface.

The JMS message oriented middleware 3 according to the state of the art can be any JMS messaging middleware product, for example, IBM's MQSeries, SoftWired's iBus, or Progress' SonicMQ.

The JMS message oriented middleware client 4 is a client application implemented on a non-mobile computer, i.e. on a computer connected to a wired computer network, using a state of the art JMS message oriented middleware 3. One or more JMS message oriented middleware clients 4 according to the state of the art can be present.

For the describing an example of the communication between different examples, it is assumed that the thin JMS message client 2 is subscribed to a topic T. Such a topic T can, depending on the application, denote a stream of stock quotes, of sports news, or denote a transmission channel carrying digital audio. When a state of the art JMS message oriented middleware client 4 sends a JMS message to topic T, the message is passed first to the state of the art JMS message oriented middleware 3. The message will then be received by the proxy 1 on behalf of thin client 2. Next, proxy 1 transmits the JMS message to client 2 in the form of a message token using one of its transport protocol adapters 1a, 1b, 1c, 1d, 1e, 1f or 1g. Finally client 2 receives the JMS message on topic T as if it was accessing the state of the art JMS message oriented middleware 3 directly.

In order to show this procedure in more detail, in the following an example of the method for delivering information between applications running on mobile wireless devices and serving as clients and applications running on non-mobile computers is described with reference to FIG. 2.

Figure 2:
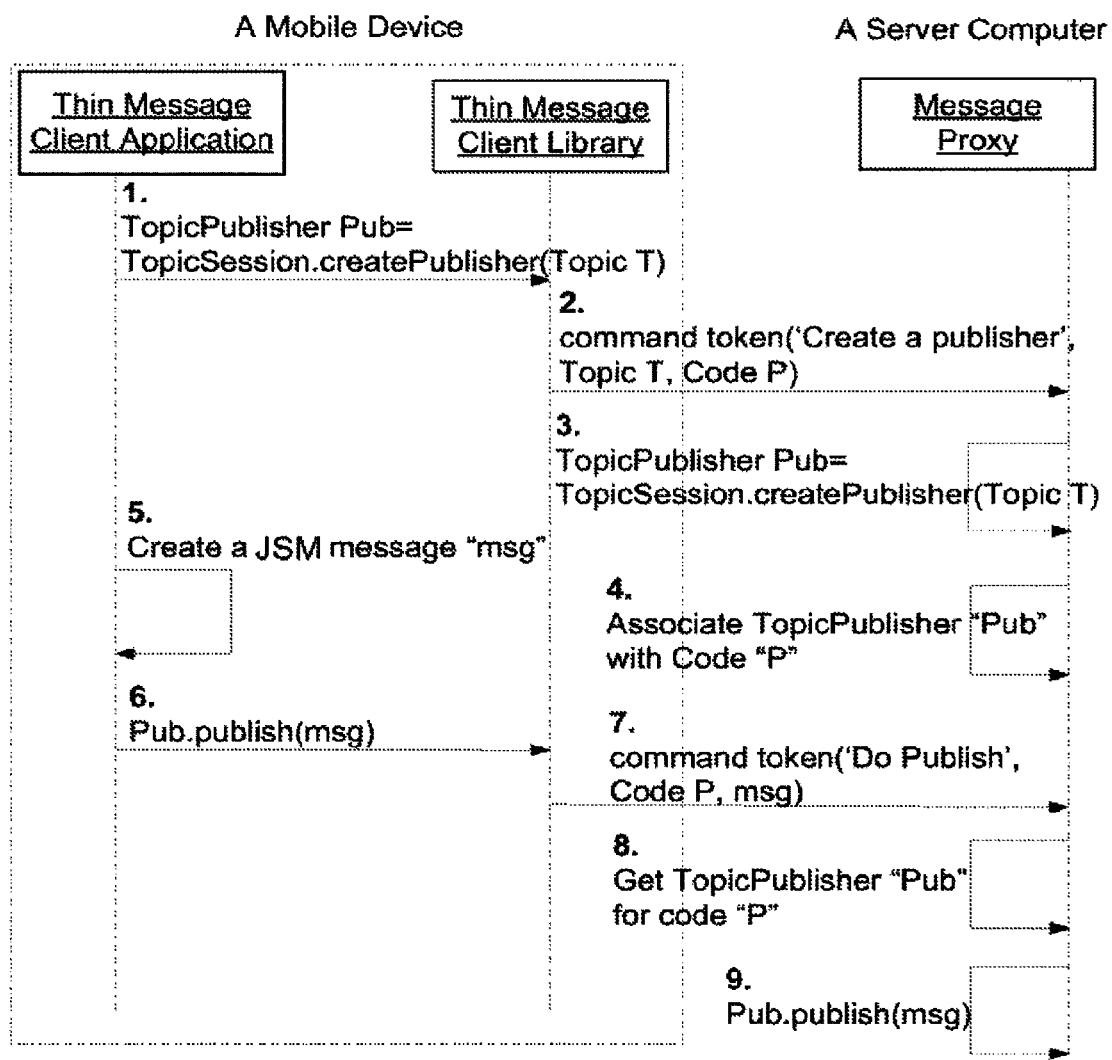
FIG. 2 shows a UML sequence diagram of an embodiment of the method according to the present invention.

The sequence diagram of FIG. 2 shows the interactions—represented by arrows—occurring between a mobile client and a proxy during one information exchange, namely during the creation of a JMS TopicPublisher for a topic T by the mobile client and a subsequent publishing of a message published on Topic T. In the diagram, the mobile client is symbolized by a shaded and dashed box. The vertical line on the right hand side of the figure represents the message proxy. The method steps are denoted by numbers which are not to be confused with the reference numerals of FIG. 1.

1. A JMS TopicPublisher object "Pub" is created, upon request of the application, for JMS publish/subscribe topic "T". Later, "Pub" will allow the mobile client application to publish a JMS message on topic "T".

2. The Thin Message Client Library creates a command token containing the information which is needed by tire proxy for allocating a JMS TopicPublisher, on behalf of the client. The command token contains a code information (e.g. a one-byte number) denoting a 'Create a publisher' command. It also contains the JMS topic "T" the publisher shall be tied to (e.g. a one-byte number), as well as an information Code "P" (e.g. a one-byte number) denoting the publisher.

3. The proxy creates a JMS TopicPublisher "Pub" for topic "T" on behalf of the thin client.

4. The proxy associates Topic-Publisher "Pub" with the code information "P". This can be done by storing the TopicPublisher "Pub" into a data dictionary, using code information "P" as the search key.

5. The client application creates a JMS message "msg" containing application specific information, e.g., a book order. This step, of course, as well as the subsequent step 6, can be carried out following to or simultaneously to steps 3 and 4.

6. The client application now publishes JMS message "msg" on topic "T", using TopicPublisher "Pub".

7. The Thin Message Client Library creates a command token containing the information which is needed by the proxy for publishing the message using state-of-the-art JMS middleware. The command token contains a code information (e.g. a one-byte number) denoting a 'Do publish' command. It also contains the code information for the TopicPublisher (Code "P") as well as the message "msg".

8. The proxy retrieves the TopicPublisher "Pub", which is associated with Code "P". This publisher "pub" was associated with Code "T" in Step 4.

9. Finally, the proxy publishes the JMS message "msg" on topic "T" using a state of the art JMS middleware. Concretely, the proxy forwards the message "msg" on topic "T" to a state of the art JMS application using JMS.

GLOSSARY OF TERMS USED

TCP: Transmission Control Protocol
IP: Internet Protocol
HTTP: Hypertext Transfer Protocol
WAP: Wireless Application Protocol
WDP: WAP Wireless Datagram Protocol
SSL: Secure Socket Layer
JMS: Java Message Service (http://java.sun.com/products/jms/)
PDA: Personal Digital Assistant
SMS: Short Messaging Service
GSM: Global System for Mobile Telecommunication
DAB: Digital Audio Broadcast
JDBC: Java Database Connectivity (http:/java.sun.com/products/jdbc/)
ODBC: Microsoft's Open Database Connectivity
MOM: Message Oriented Middleware

What is claimed is:

1. A system comprising:
a server comprising at least one processor, a proxy being configured to operate on the at least one processor, the proxy being configured to:
receive a first command token from a client, the first command token containing subscription information of a topic to which the client wishes to subscribe, the first command token further containing a publisher code for the topic, the publisher code being a number;
subscribe to the topic on behalf of the client according to the subscription information;
associate the publisher code with identification information of the subscribed topic, the identification information being larger than the publisher code;
receive a second command token from the client, the second command token comprising the publisher code and a first message, the second command token not including the subscription information of the topic;
retrieve the identification information of the subscribed topic according to the publisher code in the second command token; and
publish the first message on the subscribed topic.

2. The system of claim 1, wherein the proxy is further configured to:
receive a third command token from the client, the third command token comprising the publisher code and an indication that the client wishes to unsubscribe from the topic;
retrieve the identification information of the subscribed topic according to the publisher code in the third command token, the third command token not including the subscription information of the topic; and
unsubscribe from the subscribed topic on behalf of the client.

3. The system of claim 1, wherein the client is a wireless client.

4. The system of claim 1, wherein the proxy is further configured to:
receive a second message from a message oriented middleware system related to the topic; and
send the second message to the client using the identification information.

5. The system of claim 1, wherein the proxy is configured to maintain the identification information in a database.

6. The system of claim 1, wherein the proxy is further configured to maintain messages sent to the client in a database.

7. The system of claim 1, wherein the proxy is further configured to send messages to the client according to a guaranteed quality of service.

8. A system comprising:
a user device comprising at least one processor, a message client being configured to operate on the at least one processor, the message client being configured to:
create a publisher object for a topic,
create a first command token in response to the creation of the publisher object, the first command token comprising a create-publisher command code, a topic code for the topic, and a publisher code, the publisher code being a number,
send the first command token to a proxy to subscribe to the topic,
create a message using the publisher object;
create a second command token in response to the creation of the message using the publisher object, the second command token comprising a publish command code, the message, and the publisher code, the second command token not including the topic code for the topic, and
send the second command token to the proxy.

9. The system of claim 8, wherein the message client is further configured to:
create a third command token, the third command token comprising an unsubscribe command code and the publisher code, the third command token not including the topic code for the topic, and
send the third command token to the proxy.

10. The system of claim 8, wherein the message client is not configured to have an actual representation of the topic.

11. The system of claim 8 further comprising a database adapter configured to maintain messages sent to the proxy in a database.

12. The system of claim 8 further comprising a protocol adapter configured to send messages sent to the proxy according to a guaranteed quality of service.

13. The system of claim 8, wherein the publisher code is a one-byte number.

14. A system comprising:
a user device comprising at least one first processor, a message client being configured to operate on the at least one first processor; and
a server comprising at least one second processor, a proxy being configured to operate on the at least one second processor;
wherein:
the message client is configured to create a publisher object for a topic,
the message client is configured to create a first command token in response to the creation of the publisher object, the first command token comprising a create-publisher command code, a topic code for the topic, and a publisher code, the publisher code being a number,
the message client is configured to send the first command token,
the proxy is configured to receive the first command token,
the proxy is configured to subscribe to the topic according to the topic code,
the proxy is configured to associate the publisher code with identification information of the subscribed topic, the identification information being larger than the publisher code,
the message client is configured to create a first message using the publisher object,
the message client is configured to create a second command token in response to the creation of the first message using the publisher object, the second command token comprising a publish command code, the first message, and the publisher code, the second command token not including the topic code for the topic,
the message client is configured to send the second command token to the proxy,
the proxy is configured to receive the second command token,
the proxy is configured to retrieve the identification information of the subscribed topic according to the publisher code in the second command token, and
the proxy is configured to publish the first message on the subscribed topic.

15. The system of claim 14, wherein:

the message client is configured to create a third command token, the third command token comprising an unsubscribe command code and the publisher code, the third command token not including the topic code for the topic, the message client is configured to send the third command token to the proxy, the proxy is configured to receive the third command token, the proxy is configured to retrieve the identification information of the subscribed topic according to the publisher code in the third command token, and the proxy is configured to unsubscribe from the topic.

16. The system of claim 14, wherein the proxy is further configured to:

receive a second message from a message oriented middleware system related to the topic, and send the second message to the user device.

17. The system of claim 14, wherein the proxy is configured to maintain the topic code and the publisher code in a database.

18. The system of claim 14, wherein the proxy is further configured to maintain messages sent to the user device in a database.

19. The system of claim 14, wherein the user device comprises a database adapter configured to maintain messages sent to the proxy in a database.

20. The system of claim 14, wherein:

the proxy comprises a first protocol adapter configured to send messages to the user device according to a guaranteed quality of service, and the user device comprises a second protocol adapter configured to send messages to the proxy according to the guaranteed quality of service.

* * * * *